United States Patent
Zhou et al.

(10) Patent No.: US 9,325,143 B2
(45) Date of Patent: Apr. 26, 2016

(54) EXCIMER LASER COMPOSITE CAVITY

(71) Applicant: Academy of Opto-Electronics, Chinese Academy of Sciences, Beijing (CN)

(72) Inventors: Yi Zhou, Beijing (CN); Yaoying Shan, Beijing (CN); Yuanyuan Fan, Beijing (CN); Xingliang Song, Beijing (CN); Lijia Zhang, Beijing (CN); Huirong Cui, Beijing (CN); Yu Wang, Beijing (CN)

(73) Assignee: ACADEMY OF OPTO-ELECTRONICS, CHINESE ACADEMY OF SCIENCE, Beijing (CN)

(*) Notice: Subject to any disclaimer, the term of this patent is extended or adjusted under 35 U.S.C. 154(b) by 0 days.

(21) Appl. No.: 14/652,223

(22) PCT Filed: Dec. 20, 2012

(86) PCT No.: PCT/CN2012/086971
§ 371 (c)(1),
(2) Date: Jun. 15, 2015

(87) PCT Pub. No.: WO2014/094262
PCT Pub. Date: Jun. 26, 2014

(65) Prior Publication Data
US 2015/0372443 A1    Dec. 24, 2015

(51) Int. Cl.
*H01S 3/08* (2006.01)
*H01S 3/082* (2006.01)
*H01S 3/225* (2006.01)
*H01S 3/10* (2006.01)

(52) U.S. Cl.
CPC ............... *H01S 3/08004* (2013.01); *H01S 3/08* (2013.01); *H01S 3/082* (2013.01); *H01S 3/08009* (2013.01); *H01S 3/10* (2013.01); *H01S 3/225* (2013.01); *H01S 3/08036* (2013.01)

(58) Field of Classification Search
CPC . H01S 3/08004; H01S 3/08009; H01S 3/225; H01S 3/034; H01S 3/073
See application file for complete search history.

(56) References Cited

U.S. PATENT DOCUMENTS

| 5,150,370 A | 9/1992 | Furuya et al. |
| 6,590,921 B2 | 7/2003 | Tada et al. |
| 2002/0031158 A1* | 3/2002 | Kleinschmidt ..... G03F 7/70025 372/55 |

FOREIGN PATENT DOCUMENTS

| CN | 1158507 | * 9/1997 |
| CN | 1411113 | 4/2003 |
| CN | 102969649 | 3/2013 |
| JP | 03139893 | 6/1991 |
| JP | 03209887 | 9/1991 |

OTHER PUBLICATIONS

International Search Report issued in the corresponding International Application No. PCT/CN2012/086971, dated Oct. 3, 2013, 3 pages.

\* cited by examiner

*Primary Examiner* — Armando Rodriguez
(74) *Attorney, Agent, or Firm* — Hamre, Schumann, Mueller & Larson, P.C.

(57) ABSTRACT

Disclosed is an excimer laser composite cavity, comprising a laser discharge cavity, a laser output module, a line-width narrowing module, and a laser amplification module. The laser discharge cavity contains work gas for generating laser when it is activated by an excitation source. The laser discharge cavity, the laser output module, and the line-width narrowing module constitute a line-width narrowing cavity configured to narrow down a line-width of the laser generated by the work gas. The laser discharge cavity, the laser output module, and the laser amplification module constitute an amplification cavity configured to amplify power of the laser with the line-width having been narrowed down by the line-width narrowing cavity.

10 Claims, 3 Drawing Sheets

EXCIMER LASER COMPOSITE CAVITY

TECHNICAL FIELD

The present disclosure relates to the field of laser technology, and in particular, to an excimer laser composite cavity. Especially, the present disclosure relates to an excimer laser composite cavity with a narrow line-width and high power output.

BACKGROUND

With the development of semiconductor industry, manufacture of large-scale integrated circuits places increasing requirement on photolithography technology. Excimer laser devices as light sources of photolithography are crucial to improvement of the photolithography technology. It is desired that the excimer laser devices have both a narrow line-width and high power output. However, a conventional combination of a laser and a line-width narrowing module narrows down the line-width by sacrificing the power output. Therefore, in order to achieve both the narrow line-width and the high power output, the power output and the line-width of a laser device has to be adjusted properly so as to obtain an excimer laser to meet special requirements (for example, suitable for use as a photolithography light source).

SUMMARY

The present disclosure provides, among other things, an excimer laser composite cavity, comprising a laser discharge cavity, a laser output module, a line-width narrowing module, and a laser amplification module. The laser discharge cavity contains work gas for generating laser when it is activated by an excitation source. The laser discharge cavity, the laser output module, and the line-width narrowing module constitute a line-width narrowing cavity configured to narrow down a line-width of the laser generated by the work gas. The laser discharge cavity, the laser output module, and the laser amplification module constitute an amplification cavity configured to amplify power of the laser with the line-width having been narrowed down by the line-width narrowing cavity. The laser output module is configured to output the laser with a narrowed line-width and amplified power According to a specific implementation of the present disclosure, the laser output module may be an output coupling lens, and the laser discharge cavity may have two ends, wherein the output coupling lens may be arranged at one end, and the line-width narrowing module and the laser amplification module may be arranged at the other end.

According to a specific implementation of the present disclosure, the line-width narrowing module may comprise a single prism or a prism group and a grating, wherein: the single prism or prism group may be configured to receive the laser emitted from the laser discharge cavity, reflect a part of the laser to the amplification cavity, refract and expand a remaining part of the laser, and emit the expanded laser to the grating; and the grating may be configured to receive the expanded laser emitted from the single prism or prism group at an incident angle equivalent to a blazing angle of the grating, so that the laser incident on a surface of the grating may be dispersed and a laser with a wavelength meeting a blazing condition of the grating may be reflected back along an opposite direction of its incident path.

According to a specific implementation of the present disclosure, the laser amplification module may be a reflector configured to receive the part of the laser reflected by the single prism or prism group, and reflect the part of the laser back to the laser discharge cavity along an opposite direction of its incident path.

According to a specific implementation of the present disclosure, when the line-width narrowing module comprises the single prism, a reflectivity of an incident surface of the prism may be in a range of 4.8%~24% with respect to the laser emitted from the laser discharge cavity.

According to a specific implementation of the present disclosure, when the line-width narrowing module comprises the prism group, the prism group may comprise multiple prisms arranged in sequence along an optical path, wherein a first prism configured to receive the laser emitted from the laser discharge cavity may reflect a part of the laser to the amplification cavity.

According to a specific implementation of the present disclosure, a reflectivity of an incident surface of the first prism may be in a range of 4.8%~24% with respect to the laser emitted by the laser discharge cavity.

According to a specific implementation of the present disclosure, the amplification cavity may further comprise an etalon configured to narrow down the line-width of the laser incident thereon and transmit laser with a particular central wavelength.

According to a specific implementation of the present disclosure, the etalon may be configured to directly receive the part of the laser reflected by the single prism or prism group, and allow transmitted laser to be incident on the reflector.

According to a specific implementation of the present disclosure, spectrum of the laser transmitted by the etalon may have a same line-width as that of the composite cavity.

DETAILED DESCRIPTION

Figure 1:
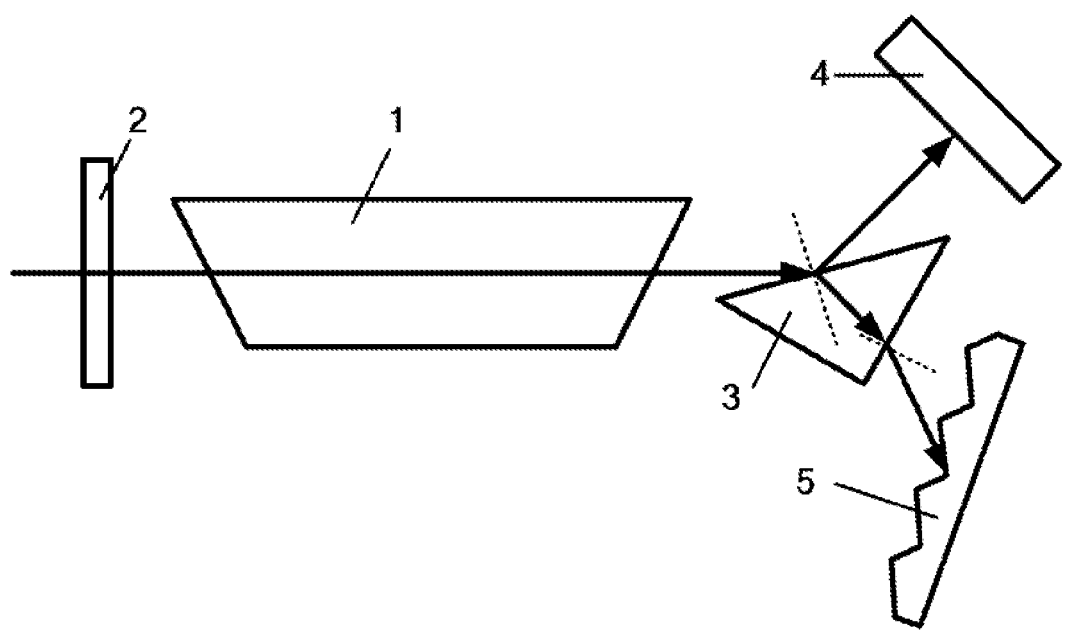
FIG. 1 is a structural diagram schematically showing an excimer laser composite cavity according to a first embodiment of the present disclosure.

The excimer laser composite cavity according to the present disclosure comprises an excimer laser discharge cavity, a laser output module, a line-width narrowing module, and a laser amplification module. The laser discharge cavity, the laser output module, and the line-width narrowing module constitute a line-width narrowing resonant cavity, also called a line-width narrowing cavity, which can narrow a line-width of laser generated by work gas in the laser discharge cavity. Also, the laser discharge cavity, the laser output module, and the laser amplification module constitute a laser amplification resonant cavity, also called an amplification cavity. The laser with a narrow line-width output from the line-width narrowing cavity is injected into the amplification cavity, and is gradually amplified by reciprocal oscillation in the laser amplification resonant cavity. Wide-spectrum laser mode in the amplification cavity will be replaced by narrow line-width laser mode due to mode competition. In this case, laser with a narrow line-width and high power may be output from the composite cavity. Thus, the composite cavity constituted by the line-width narrowing cavity and the amplification cavity can output the laser with the narrow line-width and the high power through the laser output module.

The laser output module according to the present disclosure is a coupling output lens of an excimer laser system, which is configured to constitute a laser resonant cavity in cooperation with the line-width narrowing module and the laser amplification module. The laser output module may generally comprise a flat lens with a reflectivity in a range of 20%~73% or an uncoated flat lens with a very high transmittance.

The line-width narrowing module according to the present disclosure is configured to control a spectrum of the laser generated by natural oscillation, including narrowing of the line-width and selection of a central wavelength, and can output laser with a required line-width and a required central wavelength in practical applications. The line-width narrowing module may generally be constituted by a combination of several dispersion elements, such as a prism, a grating, an etalon, or the like. The function of the line-width narrowing module is achieved with the cooperation of a gain medium in the laser discharge cavity, i.e., the work gas of the excimer laser.

The laser amplification module according to the present disclosure is configured to amplify the power of the laser with a narrowed line-width, and is substantially equivalent to a further laser resonant cavity, which is generally constituted by a reflector with a certain reflectivity in cooperation with an output coupling lens. Also, the function of the laser amplification module is achieved with the cooperation of the gain medium in the laser discharge cavity.

In order to make the purpose, technical solutions, and advantages of the present disclosure more obvious, the present disclosure will be further described in detail below in conjunction with specific embodiments and with reference to accompanying drawings.

First Embodiment

FIG. 1 illustrates a structural diagram of an excimer laser composite cavity according to a first embodiment of the present disclosure. As shown in FIG. 1, the composite cavity comprises an excimer laser discharge cavity 1, an output coupling lens 2, a prism 3, a reflector 4, and a grating 5. The output coupling lens 2 constitutes the laser output module described above, the prism 3 and the grating 5 constitute the line-width narrowing module described above, and the reflector 4 constitutes the laser amplification module described above.

The excimer laser is laser generated by excitation of dipolymer. When inert gas and halogen gas are mixed together proportionally under a certain pressure, gas atoms jump from a ground state to an excited state or are even ionized under the effect of an excitation source. Atoms or ions in the excited state are very easy to be combined into molecules, which have a lifespan of only dozens of nanoseconds. When a number of molecules in the excited state is much greater than a number of excimers in the ground state, ion number inversion occurs. When the excimers jump back to the ground state from the excited state, photons are released, and are oscillated in the resonant cavity to generate laser. At the same time, the rare gas and the halogen gas in an excimer state are rapidly dissociated into 2 atoms. The excimer laser discharge cavity 1 is an integrated modular discharge cavity, which comprises a pumping source, a working medium, and discharge electrodes, or the like, and is the most important portion of the laser. The laser discharge cavity 1 will generate laser in a pumping condition. The working medium (such as ArF or the like) in the laser cavity is excited by using a high-voltage electric power as the excitation source, to enable particle inversion and produce laser oscillation in the laser discharge cavity 1 to output the laser. The laser discharge cavity 1 has two ends, and the output coupling lens 2 is arranged adjacent to an exit window at one end of the laser discharge cavity 1, as shown in FIG. 1. The output coupling lens 2 is configured to constitute a resonant cavity in cooperation with the line-width narrowing module and the power amplification module. The laser generated in the resonant cavity is emitted through the output coupling lens 2. The output coupling lens 2 is adjusted to be completely parallel to the grating 5 as the line-width narrowing module or the reflector 4 as the laser amplification module on the other end, so that the laser can be reciprocally oscillated therebetween. The output coupling lens 2 preferably is a flat lens with a certain reflectivity, which is preferably in a range of 20%~73%, and more preferably, in a range of 40%~50%.

The prism 3 is arranged adjacent to an exit window at the other end of the laser discharge cavity 1 opposite to the output coupling lens 2, as shown in FIG. 1. A vertex angle of the prism 3 is set upward, and the laser is incident on a sloping side of the prism 3 and exits from a right-angle side of the prism 3. On one hand, the prism 3 acts as a prism for beam expansion in the line-width narrowing module, so that the laser incident on the grating 5 has an enough length, thereby further facilitating central wavelength and line-width selection by the grating 5. On the other hand, a part of the laser reflected by the incident surface of the prism 3 is incident on the reflector 4, so that the laser may be oscillated in the amplification cavity. The material of the prism 3 may be an ultraviolet-level fused silica material, or a material with good transmittance of ultraviolet light, such as $CaF_2$, $MgF_2$, or the like. The prism 3 may be a right-angle prism or a prism with a particular angle, as long as it can realize beam expansion, for example, a prism with a vertex angle in a range of 69°~76°. At the same time, the reflectivity of the incident surface of the prism 3 with respect to the beam is required to be designed strictly according to a principle that the power of the laser injected into the line-width narrowing module is dose to the power of the laser injected into the amplification cavity. According to the calculations and experiments of the inventor, in a preferable embodiment of the present disclosure, the reflectivity of the incident surface of the prism 3 is in a range of 4.8%~24%. More preferably, the reflectivity of the incident surface of the prism 3 is in a range of 10%~20%.

The reflector 4 is also arranged on the other end of the laser discharge cavity 1 opposite to the output coupling lens 2, as shown in FIG. 1. The reflector 4 is configured to receive the laser reflected by the incident surface of the prism 3, and reflect the laser back to the laser discharge cavity 1 along an opposite direction of its incident path. The reflector 4 constitutes an amplification cavity in cooperation with the output coupling lens 2. The reflector 4 is preferably a planar mirror with a reflectivity greater than 70%.

The grating 5 is arranged behind the prism 3 in the optical path of the line-width narrowing cavity, to receive the expanded laser emitted from the prism 3. The laser is incident at an incident angle equivalent to a blazing angle of the grating 5, and the laser incident on the surface of the grating 5 is dispersed, and thus a spectrum width and a central wavelength may be selected. The grating 5 is placed in a Littrow mode, so that the laser with a wavelength which meets the blazing condition of the grating 5 is reflected back along an opposite direction of its incident path. According to the reciprocity principle of the optical path, the laser returned from the grating 5 is incident on the output coupling lens 2 again, thereby achieving reciprocal oscillation of the laser. The grating 5 is preferably an echelle grating, and more preferably, a Littrow grating (for a common grating equation d(sin α+sin β)=mλ, a condition where α=β=90° corresponds to a grating in the Littrow mode).

For the excimer laser, when a number of molecules in the excited state is much greater than a number of excimers in the ground state, ion number inversion occurs. When the excimers jump back to the ground state from the excited state, photons are released. In this case, the light emitted from the discharge cavity is referred to as laser. The laser is oscillated and amplified by the resonant cavity and is finally emitted. A laser emitted by a common excimer laser is in the ultraviolet band. For example, the ArF laser generates laser with a wavelength of 193 nm, and the KrF laser generates laser with a wavelength of 248 nm.

In this case, there are two resonant cavities which can generate laser. One resonant cavity is a line-width narrowing cavity comprising the line-width narrowing module, the output coupling lens 2, and the laser discharge cavity 1. The line-width narrowing module comprises the prism 3 and the grating 5. The other resonant cavity is an amplification cavity comprising the reflector 4 as a laser amplification module, the laser discharge cavity 1, and the output coupling lens 2. Thus, the amplification cavity includes no dispersion element.

The working principle of the line-width narrowing cavity is as follows. When the laser in the laser discharge cavity 1 is incident on the sloping side of the prism 3, the beam emitted from the right-angle side is expanded about 10 times relative to the incident beam, and the expanded beam is incident on the grating 5 at the incident are equivalent to the blazing angle of the grating 5. As the grating 5 is in the Littrow mode, the dispersed laser reflected by the grating 5 is returned back along an opposite direction of its incident path. In this case, the grating 5 and the output coupling lens 2 constitute a resonant cavity, which is the line-width narrowing cavity. With the line-width narrowing cavity including the line-width narrowing module constituted by the prism 3 and the grating 5, a laser with a narrow line-width is output from the output coupling lens 2. Specifically, with the line-width narrowing cavity, the beam is expanded by the prism 3 and is then incident on the grating. The spectrum and a line-width are selected by dispersion and then the laser emitted from the line-width narrowing cavity has a narrow line-width.

At the same time, after the laser is generated, in the process that the laser is reciprocally propagated in the line-width narrowing cavity, when the laser is incident on the sloping side of the prism 3, a part of the laser is reflected to the reflector 4. The reflector 4 is preferably a reflector with a high reflectivity. In this case, the reflector 4 and the output coupling lens 2 constitute a laser amplification resonant cavity, i.e., an amplification cavity.

The laser in the two resonant cavities as described above, i.e., the laser with the narrow line-width, is continuously amplified in the amplification cavity through mode competition. The process of mode competition is as follows. There are at least two laser modes in the composite cavity, in which one is a laser with a narrow line-width, called v1, and the other is a laser with high power and wide line-width in the amplification cavity, called v2. Initially, both gains of the two lasers are greater than a threshold, and therefore, the light intensities for the two modes increase gradually. As the gain curves gradually drop, the gain of the laser in the v2 mode is equivalent to the loss, and therefore, the power will not increase any more. However, the gain in the v1 mode is still greater than the threshold, and therefore the power will continue to increase. As such, the gain coefficient in the v2 mode will become less than the threshold in a short time. Therefore, the light intensity in the v2 mode rapidly reduces, or even reduces to 0. Finally, only the laser in the v1 mode is stably oscillated in the resonant cavity. That is, the oscillation in the amplification cavity is locked by the narrow line-width laser mode in the line-width narrowing cavity, so as to achieve oscillation of a laser with high power and a narrow line-width. Therefore, the laser with the narrow line-width and high power is finally output.

Second Embodiment

The overall structure of the second embodiment is the same as that in the first embodiment, but the difference therebetween is that in the second embodiment, the single prism 3 in the first embodiment is replaced by a group of prisms. That is, the line-width narrowing module in the composite cavity in the second embodiment is different from that in the first embodiment.

Figure 2:
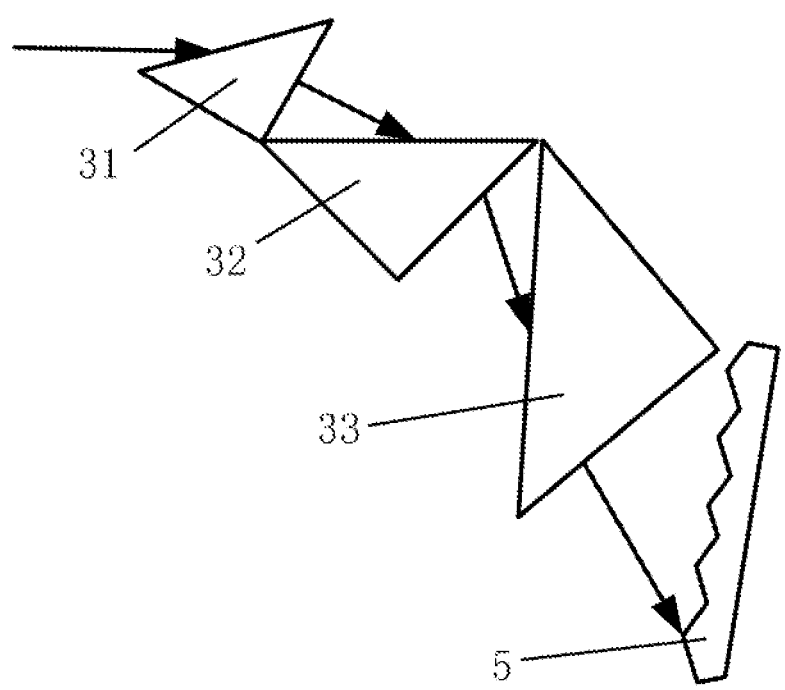
FIG. 2 is a structural diagram schematically showing a line-width narrowing module of an excimer laser composite cavity according to a second embodiment of the present disclosure.

FIG. 2 is a structural diagram of a line-width narrowing module of an excimer laser composite cavity according to the second embodiment of the present disclosure. As shown in FIG. 2, the group of prisms is constituted by multiple right-angle prisms 31, 32, and 33 arranged in sequence. The laser emitted from the laser discharge cavity 1 is incident on the sloping side of the prism 31 and is emitted from a right-angle side of the prism 31. The laser emitted from the prism 31 is incident on the sloping side of the prism 32 and is emitted from a right-angle side of the prism 32. The laser emitted from the prism 32 is incident on the sloping side of the prism 33 and is emitted from a right-angle side of the prism 33 to the grating 5.

The function of the prism 31 is the same as that of the prism 3 in the first embodiment, and the requirements for the reflectivity of the incident surface thereof are also the same as that of the prism 3, i.e., the reflectivity of the incident surface is in a range of 4.8%~24%, and more preferably, in a range of 10%~20%.

With the group of prisms constituted by the multiple prisms, it can be easier to meet the requirements for the beam expanding ratio, thereby facilitating output of the laser with the narrow line-width. However, since the absorption of the light power by the composite cavity will be increased as the number of prisms increases, it is disadvantageous for outputting the laser with high power.

Third Embodiment

Figure 3:
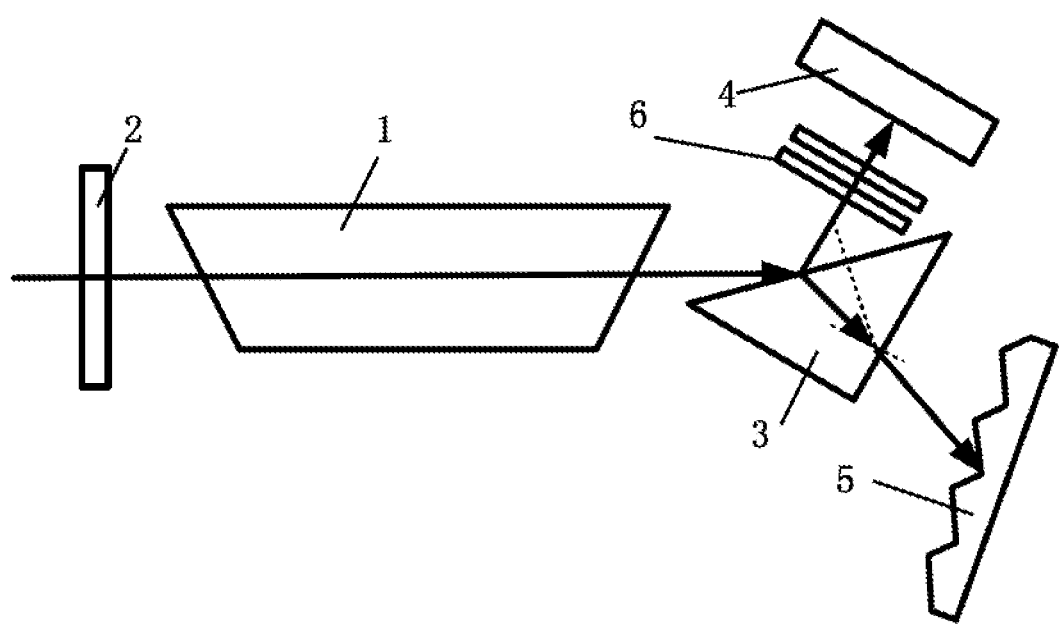
FIG. 3 is a structural diagram schematically showing an excimer laser composite cavity according to a third embodiment of the present disclosure.

FIG. 3 is a structural diagram of an exicmer laser composite cavity according to a third embodiment of the present disclosure. As shown in FIG. 3, the basic structure in the third embodiment is also the same as that in the first embodiment, and the difference therebetween is that an etalon 6 is added in the amplification cavity. The etalon is a dispersion element which is made according to multi-beam interference principle. In the technical field of optics, a Fabry-Pérot interferometer is a multi-beam interferometer constituted by two parallel glass plates, wherein two opposite internal surfaces of the two glass plates each have a high reflectivity. The Fabry-Pérot interferometer is often referred to as a Fabry-Pérot resonant as well, and when the two glass plates are fixed by using a hollow spacer with a fixed length, it is also referred to as a Fabry-Pérot etalon or an etalon for short.

As shown in FIG. 3, in the embodiment, the line-width narrowing module comprises a single prism 3. However, the single prism 3 may also be replaced by the group of prisms illustrated in FIG. 2. The prism 3 is a right-angle prism in the second embodiment. The laser emitted by the laser discharge cavity 1 is incident on the sloping side of the prism 3, and a part of the laser is reflected by the sloping side as an incident surface to the etalon 6. The remaining part of the laser is refracted and expanded in the prism 3, and is emitted from a right-angle side of the prism 3 to the grating 5.

The etalon 6 is configured to receive the laser partly reflected by the prism 3, narrow the line-width of the laser incident thereon, and transmit the laser with a particular central wavelength. The etalon 6 is placed in the amplification cavity, and can achieve selection of the line-width and central wavelength of the spectrum of the laser in the amplification cavity, to assist in implementation of the function of the line-width narrowing module. Therefore, it is more beneficial to the emission of the laser with a narrow line-width and high power. The line-width of the spectrum of the laser transmitted by the etalon 6 is consistent with the line-width required by the whole composite cavity.

With the etalon 6, the laser with the target line-width and central wavelength can be more stably output. However, as the etalon 6 is a lossy element, when the etalon 6 is placed in the composite cavity, it may influence the improvement of the power of the laser.

According to various embodiments of the present disclosure, the line-width and output power of the excimer laser can be adjusted properly so that the laser can have both a narrow line-width and a high output power. Also, the output power of the laser can be stabilized. The excimer laser has a relatively simple structure and is easy to manufacture and tune. The excimer laser may be advantageously used as a photolithography light source.

The embodiments described above are merely particular implementations for implementing the present disclosure. According to the present disclosure, the power amplification module and the line-width narrowing module may also be constituted by other optical elements which meet the characteristics of the excimer laser. The selection of a number of prisms in the group of prisms in the second embodiment and the addition or deletion of other optical components in various embodiments may be implemented by those skilled in the art according to practical requirements without departing from the substance of the present disclosure. Therefore, the above embodiments do not constitute limitation of the protection scope of the present disclosure. Any modification, equivalent substitution, improvement etc., made within the spirit and principle of the present disclosure, should be included in the protection scope of the present disclosure.

We claim:

1. An excimer laser composite cavity, comprising:
   a laser discharge cavity, which contains a work gas for generating a laser beam when the work gas is activated by an excitation source;
   a laser output module;
   a line-width narrowing module; and
   a laser amplification module, wherein:
      the laser discharge cavity, the laser output module, and the line-width narrowing module constitute a line-width narrowing cavity configured to narrow down a line-width of the laser beam generated by the work gas;
      the laser discharge cavity, the laser output module, and the laser amplification module constitute an amplification cavity configured to amplify power of the laser beam with the line-width of the laser beam having been narrowed down by the line-width narrowing cavity; and
      the laser output module is configured to output the laser beam with a narrowed line-width and amplified power.

2. The excimer laser composite cavity according to claim 1, wherein:
   the laser output module is an output coupling lens; and
   the laser discharge cavity has two ends, wherein the output coupling lens is arranged at one end, and the line-width narrowing module and the laser amplification module are arranged at the other end.

3. The excimer laser composite cavity according to claim 2, wherein the line-width narrowing module comprises a single prism or a prism group and a grating, wherein:
   the single prism or the prism group is configured to receive the laser beam emitted from the laser discharge cavity, reflect a part of the laser beam to the amplification cavity, refract and expand a remaining part of the laser beam, and emit the expanded laser beam to the grating; and
   the grating is configured to receive the expanded laser beam emitted from the single prism or the prism group at an incident angle equivalent to a blazing angle of the grating, so that the laser beam incident on a surface of the grating is dispersed and the laser beam with a wavelength meeting a blazing condition of the grating is reflected back along an opposite direction of its incident path.

4. The excimer laser composite cavity according to claim 3, wherein the laser amplification module is a reflector configured to receive the part of the laser beam reflected by the single prism or the prism group, and reflect the part of the laser beam back to the laser discharge cavity along an opposite direction of its incident path.

5. The excimer laser composite cavity according to claim 4, wherein when the line-width narrowing module comprises the single prism, a reflectivity of an incident surface of the single prism is in a range of 4.8%-24% with respect to the laser beam emitted from the laser discharge cavity.

6. The excimer laser composite cavity according to claim 4, wherein when the line-width narrowing module comprises the prism group, the prism group comprises multiple prisms arranged in sequence along an optical path, wherein a first prism configured to receive the laser beam emitted from the laser discharge cavity reflects a part of the laser beam to the amplification cavity.

7. The excimer laser composite cavity according to claim 6, wherein a reflectivity of an incident surface of the first prism is in a range of 4.8%-24% with respect to the laser beam emitted by the laser discharge cavity.

8. The excimer laser composite cavity according to claim 3, wherein the amplification cavity further comprises an etalon configured to narrow down the line-width of the laser beam incident thereon and transmit the laser beam with a particular central wavelength.

9. The excimer laser composite cavity according to claim 8, wherein the etalon is configured to directly receive the part of the laser beam reflected by the single prism or the prism group, and allow the transmitted laser beam to be incident on the reflector.

10. The excimer laser composite cavity according to claim 9, wherein spectrum of the laser beam transmitted by the etalon has a same line-width as that of the composite cavity.

* * * * *